Aug. 15, 1961   O. ZIMMERMANN ET AL   2,995,980
TRIPLET OBJECTIVE FOR OPTICAL APPARATUS
Filed Dec. 11, 1957

INVENTORS
Otto Zimmermann
Georg Kretsch
BY Benj. T. Rauber
their attorney

United States Patent Office 2,995,980
Patented Aug. 15, 1961

2,995,980
TRIPLET OBJECTIVE FOR OPTICAL APPARATUS
Otto Zimmermann, Wetzlar (Lahn), and Georg Knetsch, Berghausen, Kreis Wetzlar, Germany, assignors to Ernst Leitz, G.m.b.H, Wetzlar (Lahn), Germany, a corporation of Germany
Filed Dec. 11, 1957, Ser. No. 702,103
Claims priority, application Germany Dec. 21, 1956
1 Claim. (Cl. 88—57)

Heretofore, triplet objectives of a negative element enclosed between two positive elements have been constructed in known manner in which each of the three elements, or the two positive elements, or only the positive element at the image side have been assembled from several lenses.

The last mentioned, especially successful system had originally a light intensity $f:6.3$ and was brought to a light intensity of $f:2.8$ by introducing new, highly refracting, and weak dispersing glasses. It is indeed known that triplets with cemented back lenses possess a zone of spherical aberration and especially of spheric-chromatic aberration so that the system in the greatest light intensity installation is suited only for small focal lengths because the error increases with the focal length.

In U.S. Letters Patent No. 1,880,394, to decrease the spherical zone, a cementing face in the negative component is introduced as well as the cementing face of the back positive component. The result obtained by this construction is indeed a smoothing of the zone but still the spheric-chromatic error is very great, whereby these two statements refer only to slight heights, which correspond to the light intensity or opening relationship of $f:6$. In this there is no solution of the problem of correcting spheric-chromatically the system to $f:2.8$.

Our invention accordingly consists in that, with a triplet with a cemented back component and an assembled cementing surface concave to the object in the negative component, the glass of the positive lens of the negative component has a smaller "Nu" value than the glass of the negative lens and that the index of refraction of these two glasses differ by at least 0.07 to about 0.16. Especially the radius ($r_4$) of this cementing surface can lie between 0.18 and 0.40 of the focal length ($f$). An embodiment of the objective, according to our invention, consists in the complete example given in the following table.

Figure 1:
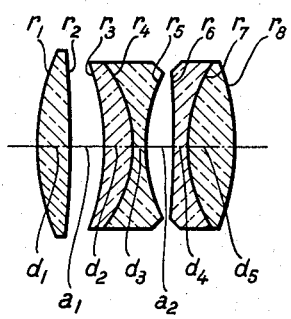
Figure 2:
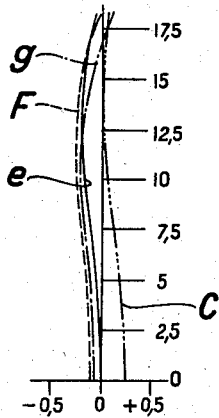

In the accompanying drawing:
FIG. 1 illustrates this example, and
FIG. 2 shows the correction curves.

In the following table the radii of the several lens faces as indicated in FIG. 1 of the drawings are designated by $r_1$ to $r_8$, the lens thicknesses by $d_1$ to $d_5$, the spacings between the lens components by $a_1$ and $a_2$, the refractive indices for the spectrum line $n_d$, and the Abbé numbers by $v$. The curves of FIG. 2 relate to the spectrum lines C, e, F and g. In the correction curves of FIG. 2 the ordinates indicate in millimeters the height of incident of rays, that is, the distance in millimeters of a parallel ray from the optical axis. The abscissa represent the spherical aberration in percentages of the focal length. Thus, a height of incidence of 17.9 would be the equivalent of an aperture ratio of 1:2.8 of a focal length of 100 millimeters.

It will be noted that the aberrations for the various wave lengths are at a maximum of about 0.25%, that is, about 0.25 mm.

*Table*

|  |  | $n_d$ | $v$ |
|---|---|---|---|
| $r_1=+44.65$ | $d_1=6.70$ | 1.69100 | 54.8 |
| $r_2=-267.94$ | $a_1=7.00$ | | |
| $r_3=-49.04$ | $d_2=5.40$ | 1.75520 | 27.5 |
| $r_4=-26.71$ | $d_3=3.00$ | 1.63980 | 34.6 |
| $r_5=+34.87$ | $a_2=4.80$ | | |
| $r_6=-1,326.67$ | $d_4=3.00$ | 1.62588 | 35.6 |
| $r_7=+29.16$ | $d_5=9.27$ | 1.74400 | 44.9 |
| $r_8=-49.93$ | | | |

Having described our invention, what we claim is:
An objective lens comprising three components in axial alignment with each other, the front component being a simple lens and the middle and rear components consisting each of two elements cemented to each other to form a doublet, said components being spaced from each other and their spatial relationship, lens radii, refractive index and Abbé number being in accordance with the data in the following table:

| Radii | Thickness | $n_d$ | $v$ |
|---|---|---|---|
| $r_1=+44.05$ | $d_1=6.70$ | 1.69100 | 54.8 |
| $r_2=-267.94$ | $a_1=7.00$ | | |
| $r_3=-49.04$ | $d_2=5.40$ | 1.75520 | 27.5 |
| $r_4=-26.71$ | $d_3=3.00$ | 1.63980 | 34.6 |
| $r_5=+34.87$ | $a_2=4.80$ | | |
| $r_6=-1,326.67$ | $d_4=3.00$ | 1.62588 | 35.6 |
| $r_7=+29.16$ | $d_5=9.27$ | 1.74400 | 44.9 |
| $r_8=-49.93$ | | | | wherein the radii of curvature $r$ of the lens surfaces are given in the first column, the respective surfaces being numbered from front to rear and being respectively identified by the subscript numeral used with each $r$, the axial thicknesses $d$ of the respective lens elements and the axial thicknesses $a$ of the air spaces between lens elements being given in the second column, the respective lens elements and air spaces to which the values $d$ and $a$ apply being numbered from front to rear and being respectively identified by numeral subscripts used with $d$ and $a$, the values of $r$, $d$ and $a$ all being expressed proportionately in millimeters per 100 millimeters of equivalent focal length of the entire lens, the plus and minus values of $r$ indicating curved surfaces which are respectively convex and concave toward the front of the lens, the corresponding refractive indices $n$ for the D line of the spectrum are given in the third column and the Abbé numbers (dispersive indices) $v$ are given in the fourth column.

References Cited in the file of this patent
UNITED STATES PATENTS

| 1,880,394 | Altman | Oct. 4, 1932 |
| 1,939,098 | Berek | Dec. 12, 1933 |
| 2,769,372 | Cook et al. | Nov. 6, 1956 |

FOREIGN PATENTS

| 526,307 | Germany | June 5, 1931 |
| 526,308 | Germany | June 10, 1931 |